United States Patent
Criado

(10) Patent No.: US 6,944,999 B2
(45) Date of Patent: Sep. 20, 2005

(54) TILE FOR CONSTRUCTION

(75) Inventor: José Maria Abad Criado, Valencia (ES)

(73) Assignee: DADA 2000, S.L., Valencia (ES)

( * ) Notice: Subject to any disclaimer, the term of this patent is extended or adjusted under 35 U.S.C. 154(b) by 0 days.

(21) Appl. No.: 10/793,046

(22) Filed: Mar. 4, 2004

(65) Prior Publication Data

US 2004/0168388 A1 Sep. 2, 2004

Related U.S. Application Data

(63) Continuation of application No. PCT/ES02/00420, filed on Sep. 6, 2002.

(30) Foreign Application Priority Data

Sep. 10, 2001 (ES) .......................................... 200102034
Jul. 9, 2002 (ES) .......................................... 200201608

(51) Int. Cl.[7] .............................................. E04F 13/08
(52) U.S. Cl. .......................... 52/390; 52/391; 52/796.1; 428/47; 428/42.1
(58) Field of Search .......................... 52/390, 391, 386, 52/392, 612, 796.1, 309.3, 309.14, 309.17, 89, 747.12; 428/42.1, 41.6, 41.8, 44, 47, 142, 143, 144; 156/157, 60, 70, 299

(56) References Cited

U.S. PATENT DOCUMENTS

| | | | | |
|---|---|---|---|---|
| 4,931,331 A | * | 6/1990 | Owens | 428/47 |
| 5,314,554 A | * | 5/1994 | Owens | 156/154 |
| 5,705,250 A | * | 1/1998 | Hudson, Jr. | 428/99 |
| 5,927,034 A | * | 7/1999 | Cole | 52/391 |
| 5,976,689 A | * | 11/1999 | Witt et al. | 428/339 |
| 6,103,333 A | * | 8/2000 | Keith | 428/99 |
| 6,641,696 B1 | * | 11/2003 | Edgerton | 156/277 |
| 6,682,821 B2 | * | 1/2004 | Fukudome et al. | 428/446 |

\* cited by examiner

*Primary Examiner*—Carl D. Friedman
*Assistant Examiner*—Chi Q. Nguyen
(74) *Attorney, Agent, or Firm*—Klauber & Jackson

(57) ABSTRACT

It has various layers in its structure: the lower layer (2, 2', 2") is a resistant base of ceramic origin or similar; the upper layer is a lamina (1) with a visible surface. The two are stuck by an adhesive defining a homogenous intermediate layer (3) without the formation of fragile zones due to the absence of air bubbles since the contact face of the ceramic base (2, 2', 2") is domed, the central point being higher than the rest. For preventing the surplus adhesive from flowing out and becoming stuck to other adjacent tiles, it has been provided for the ceramic base or similar (2, 2', 2") to include a perimetric flange (5, 5') which will then be eliminated during the phase of machining the edges when formatting the tile. The perimetric flange (5, 5') advantageously incorporates some lateral projections or centering stops (6) of the facing lamina (1) in order to optimise the pressing.

10 Claims, 3 Drawing Sheets

US 6,944,999 B2

TILE FOR CONSTRUCTION

RELATED APPLICATIONS

The present application is a Continuation of co-pending PCT Application No. PCT/ES02/00420, filed Sep. 6, 2002, which in turn, claims priority from Spanish Application Serial No.200102034, filed on Sep. 10, 2001 and Spanish Certificate Application No. 200201608, filed on Jul. 9, 2002. Applicants claim the benefits of 35 U.S.C. §120 as to the PCT application and priority under 35 U.S.C. §119 as to said Spanish applications, and the entire disclosures of applications are incorporated herein by reference in their entireties.

TECHNICAL FIELD

As stated in the title of this descriptive specification, the present invention refers to a tile for construction, which implies a new construction material for pavings and facings, which is the result of the solid union of a surface lamina of whatever kind on a base of ceramic origin or similar, of greater strength. The product obtained has industrial application in the construction sector and combines the advantages of both materials, making it possible to use a natural product such as wood, plastic, glass, metals, textile or natural materials, leather, etc., in facings and pavings, with the technical characteristics inherent to ceramics. The laying of the tile in situ permits just the beauty and characteristics of the visible lamina to be appreciated, with the technical advantages deriving from the greater consistency and ductility, plus ease of handling, provided by the base of ceramic origin.

It has special application in the ceramic sector from which notable advantages are derived with respect to existing products of identical purpose.

BACKGROUND OF THE INVENTION

The use of wood for construction dates from time immemorial, though its use for pavings and facings appeared later on. Due to wood being a natural material with a limited production, products deriving from it are always or habitually made up of a fine layer of natural wood joined to an agglomerate of wood or fibre acting as a more solid base for its application. In this way, boards are obtained with measurements greater than those which the sheet itself could give, or pavings (parquets) are achieved with certain strengths.

In either of the above cases, the wood is always converted into a living material, which in time causes imperfections in its structure and defects in its stability. This topic has been researched into in order to create bases of wood fibre origin that are increasingly more stable and consistent.

As it is a widespread practice in the ceramic sector to obtain ceramic tiles which, in their external appearance, imitate the beauty of natural fine-quality products, and as it is a habitual practice in the wood sector to try to approach materials of the versatility of ceramics as a construction material, so the tile for construction, which the invention proposes, meets both goals, creating a product with the benefits of both sectors.

In the current state of the art, tiles, slabs or wooden boards are not known having the technical qualities of the product of the present invention, with which easy and widely known laying is permitted of a product which currently requires specialists for being positioned, as is the case with wood.

SUMMARY OF THE INVENTION

In general terms, the tile for construction constituting the object of the invention is a product for pavings and facings resulting from the union and superposition of two pre-existing materials, via the solid union between a fine-quality lamina (surface) and a lamina or sheet of ceramic origin (base).

Since its characteristics are independent of the dimensions that it can present on the market, the tile, slab or board offers a surface layer which is solidly joined to a compact base, mainly of ceramic origin.

Following the extraction of the wood in forests, it is cut into fine laminas in accordance with the habitual uses of the sector. In the same way, the ceramic base is obtained following high temperature firing of a mixture of clays according to the objectives of hardness and the shapes that are required, to which the wooden lamina will later on be added by means of suitable glues or similar adhesion systems.

Following the union of both pre-existing materials and the consequent obtaining of the new product, this will be handled in accordance with the habitual uses in the wood processing sector (sanding, calibrating, varnishing, etc.) in suitable measurements for being introduced onto the market in tile format for pavings and facings. The thickness and dimensions of the end product is variable and will accord with the habitual cutting and processing measurements for tiles for laying on floors and walls.

Systematically, the preparation process can be summarised as follows:

Obtaining of the wooden lamina or similar according to the habitual uses of the sector.

Obtaining of a lamina or base of ceramic origin, according to what is habitual in the ceramic sector.

Solid union between the wooden lamina (surface) and the lamina of ceramic origin (base).

Cutting and handling of the new product resulting from the union described earlier, according to habitual uses in the wood sector for the obtaining of new tile type formats intended for acting at pavings and facings in construction.

From the industrial production and application of the tile forming the object of the invention, the following technical advantages derive, among others:

Considerable savings in the use of wooden derivatives since, in order to achieve a structural stability, hardly any wood is used, with the consequent effect on environmental impact which the production of wood has on the natural environment and forests.

Obtaining of tiles whose external appearance is entirely that of natural wood, increasing the current production capacity with less use of natural resources, without loss of the properties of strength and solidity required by tiles for pavings and facings.

Greater workability and ductility with all that this entails with regard to their displacement, transport and difficulty in laying on site.

Following their laying on site, what is seen in its entirety is natural wood which subsequently, and following its being worn with the passage of time, can be treated as such, unlike other already existing products which imply mixtures of wood and other substances or products, which in no case fully exteriorise the beauty and elegance of natural wood.

The industrial application of the present invention thus derives in an evident manner from its own nature.

In order to duly join the ceramic base with the surface sheet, it is necessary to achieve a distribution of adhesive that is homogenous and free of air bubbles, which weaken the join and create fragile zones.

It has been proven experimentally that it is necessary to provide the adhesive face of the ceramic support with a special configuration which is characterised by presenting a central point or zone that is raised with respect to the rest and progressively decreases towards the edge of the tile.

This domed or curvo-convex configuration is essential for successfully expelling the air in the pressing process since it produces a displacement of the adhesive from the centre outwards as far as expelling the surplus via the edges of the piece, thus avoiding the formation of air bubbles and/or unglued zones which, in the long term, constitute breakage points.

So that the surplus adhesive does not hang out of the sandwich determined by the multi-layer structure of the tile, a perimetric flange has been provided in the ceramic or material base being considered, projecting from the format which the tile finally has to have and which determines a retaining barrier for the glue or resins used in pressing both component pieces of the tile, the upper or facing lamina and the lower of resistant ceramic base. In this way, the already finished pieces are prevented from becoming stuck to the adjacent ones at the same time as achieving a better distribution of the adhesive since it does not project from the piece. This perimetric flange will be entirely eliminated when the piece is machined to produce the format of tile for paving or facing, as well as for the formation of slabs or boards, since its characteristics are independent of the dimensions which the piece can have on the market.

In accordance with the invention, provision has also been made for improving the gluing phase during the pressing, making the perimetric flange more withdrawn from the edge of the upper lamina and to have some internal lateral projections extending from that flange defining centring stops for the upper or facing lamina. These stops prevent movement of the upper lamina during the pressing process.

Another purpose of the presence of these centring means is to generate a zone of easy evacuation for the surplus glue, which seeks an easy escape or exit during the pressing process.

The centring projections advantageously have a narrow configuration towards the contact end with the upper or visible lamina, this end being also advantageously rounded in order to make tangential contact and thereby not obstruct the exit of surplus adhesive, which can, without any problems, invade the spaces located between the centred peripheral projections even without any need for the surface that is free of surplus adhesive to rise up unnecessarily.

In order to facilitate an understanding of the characteristics of the invention and forming an integral part of this descriptive report, attached are some sheets of drawings whose figures, having the nature of being illustrative rather than limiting, represent the following:

DESCRIPTION OF A PREFERRED EMBODIMENT OF THE INVENTION

Figure 1:
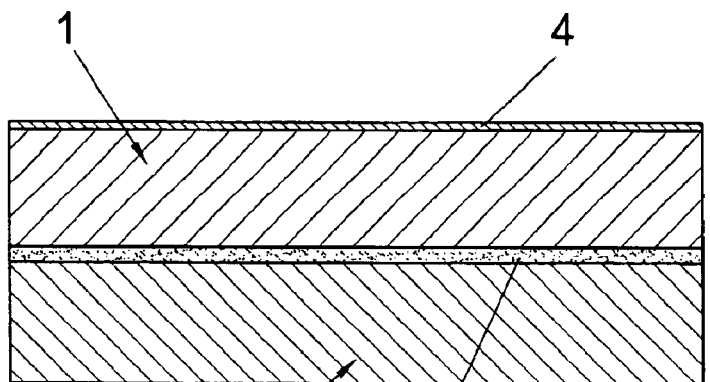
FIG. 1 is a partial and schematic view of a tile for construction, in accordance with the invention.

Making reference to the numbering adopted in the figures, we can see how the tile for construction, which the invention proposes, tackles and solves the problem of the prior art, obtaining a new product whose external appearance, following its being laid on site as paving or facing, is identical to that which would derive from laying the wood considered on its own, though with the contribution of a series of technical advantages both in the actual consistency of the material and in its application on site which make it very interesting, as we have stated earlier.

The object of the invention relates and connects two industrial sectors for the manufacture of paving and facing for construction, which are the ceramic sector and the wood sector, both widely implemented and which present great differences in terms of the raw material used for their preparation.

The tile consists of the facing lamina 1 or natural wood, such as walnut, cherry, pine, etc., and the lamina of sheet or ceramic origin 2 which constitutes the base.

The reference 3 designates the adhesive used for the perfect gluing of both materials.

The visible surface of the facing lamina 1, possesses a conventional treatment shaping a thin layer referenced with number 4, of characteristics that grant it great durability, non-slip qualities, high aesthetic level, as are provided with known varnishes and products.

This structure likewise permits the floor to be dressed, as is done with planks made exclusively of wood.

The base 2 can also be formed from a lamina or sheet of clay origin which cannot be regarded as a ceramic material. It can also be formed from a sheet of sand or cement origin.

The facing lamina 1, instead of being made of a natural wood, could also be defined by an agglomerate of various stained woods and even, as we have stated earlier, by other materials in substitution for wood, and indeed any product susceptible to being used as facing or paving in the sheet form.

Figure 2:
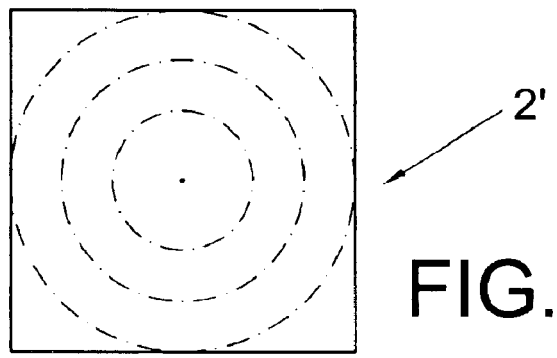
FIG. 2 is a plan view of the ceramic support for that same tile.
Figure 3:
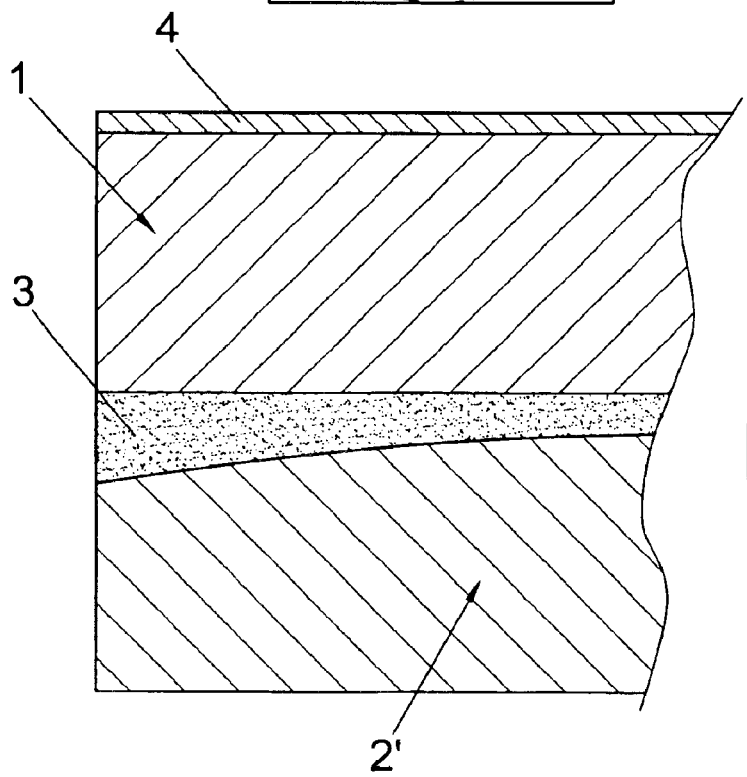
FIG. 3 is a view, on a larger scale, of the end portion of the tile, in order to see the domed shape of the ceramic component.

FIG. 2 shows in plan view a quadrangular ceramic base, referenced with 2' since it has a domed surface, unlike the one schematically shown in FIG. 1, with some concentric circumferences by way of contour lines with a lower level as they get further away from the centre, thereby obtaining a domed surface in the adhesive face with the facing lamina 1, in order to dislodge the excess glue 3 without creating bubbles when the tile is formed. In FIG. 3 this domed shape of the surface of the ceramic support defining the base 2' can be more easily seen.

Figure 4:
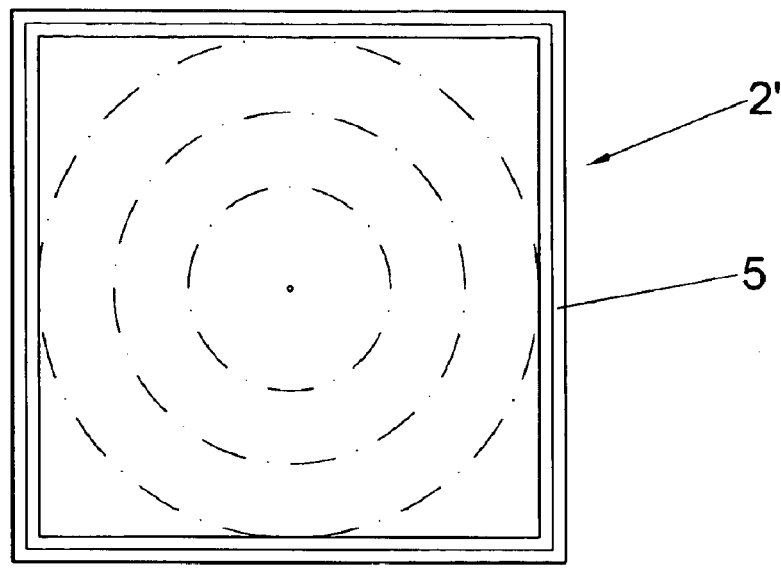
FIG. 4 is a view similar to FIG. 2, in which can be seen the overdimensioned contour of the ceramic support including the retaining flange for the applied adhesive.
Figure 5:
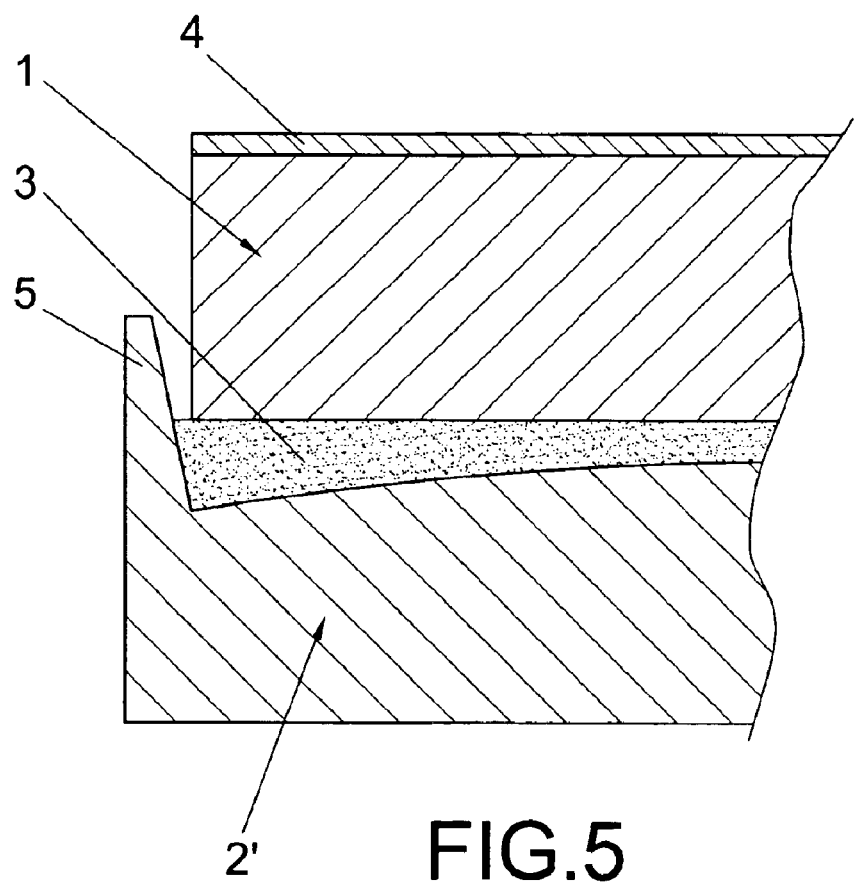
FIG. 5 is a view similar to FIG. 3, prior to cutting the projecting flange.

Making special reference now to FIGS. 4 and 5, we see that referenced with number 5 is the perimetric flange of the ceramic base 2' or of the material used as support, with which a retaining barrier is determined for the glue or resin 3 used in the pressing of the laminas 1 and 2 of the tile, in such a way that the surplus does not hang out of the sandwich determined by the laminas 1 and 2 and the adhesive layer 3. In this way, the pieces are prevented from becoming stuck to the adjacent ones, at the same time as achieving a better distribution of the adhesive since it does not exit from the piece.

The perimetric flange 5 will be entirely eliminated when the piece is machined to produce the format of tile for pavings and facings, as we have stated earlier.

Figure 6:
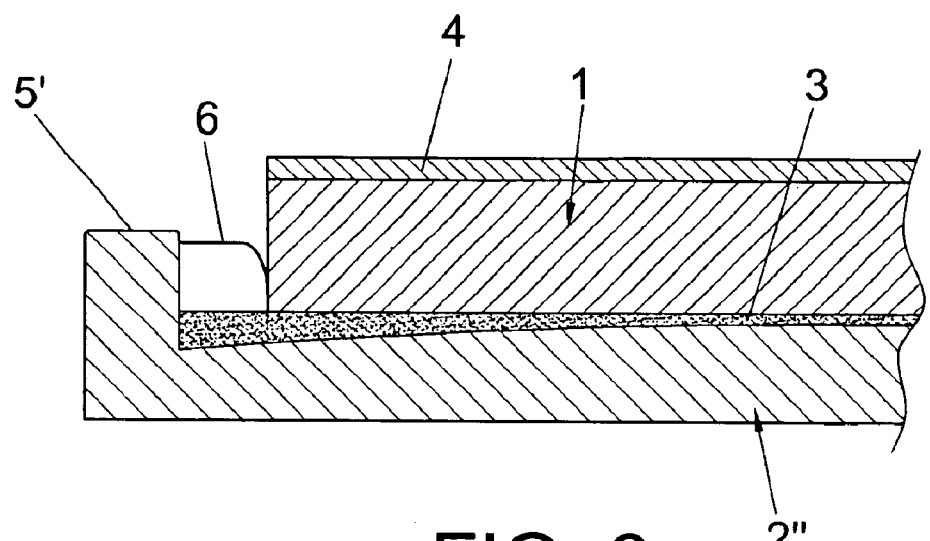
FIG. 6 is a partial view in sectioned elevation of a tile for construction, including the centring projections for the upper or facing lamina, which are emergent from the internal wall of the perimetric rib or retaining barrier for the surplus glue when effecting the pressing.
Figure 7:
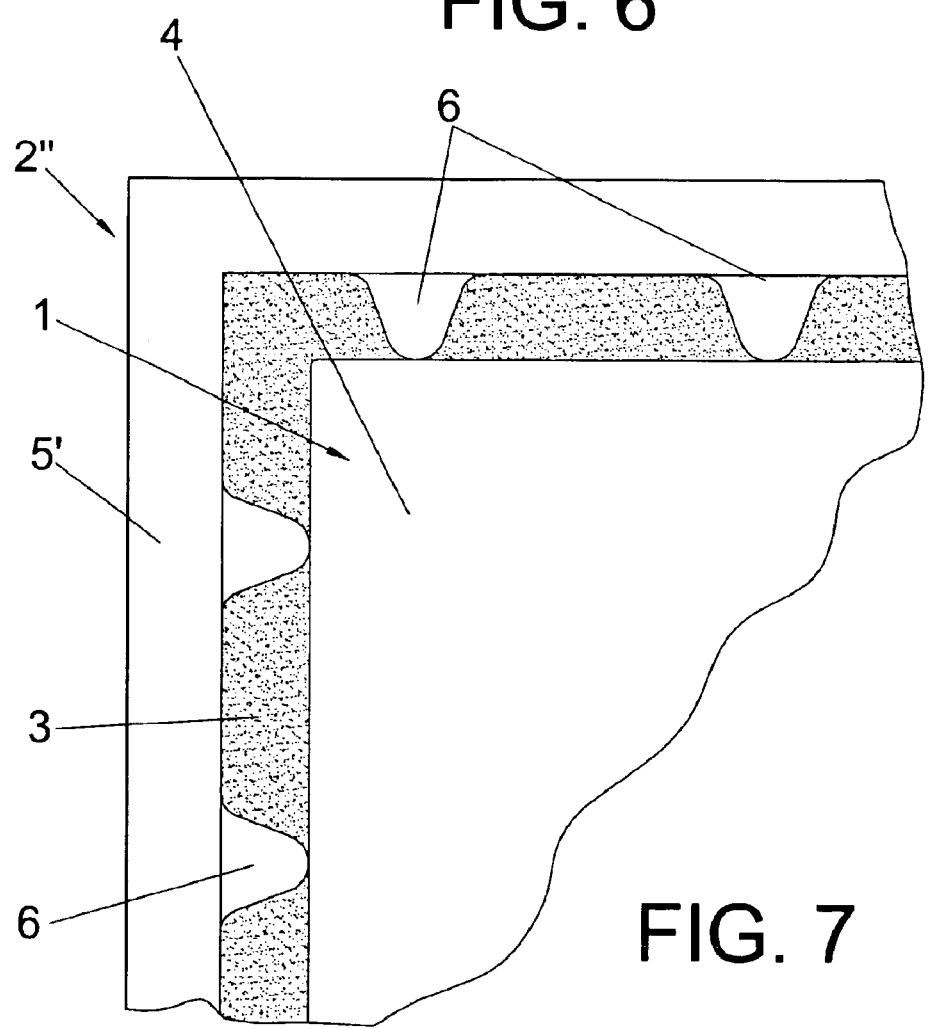
FIG. 7 is a plan view of that shown in FIG. 6.

In FIGS. 6 and 7 we can see the centring projections 6 which emerge from the perimetric barrier or flange 5' of the ceramic base or similar 2" in order to centre the facing lamina 1 which is thus positioned among them, acting as stops and which prevent the facing lamina 1 from moving during the pressing process. The suffixes "'" and "''" have been added in the numerical references designating the perimetric flange and the ceramic base or similar, due to corresponding to similar pieces included in the stated modifications.

As can be deduced by observing FIG. 7, between the lateral projections 6 of the perimetric flange 5' sufficient spaces are formed for housing the surplus glue or adhesive 3 during the pressing phase.

In the contact end with the upper lamina 1, the lateral projections 6 establish contact with and correctly guide the said upper lamina, according to a generatrix owing to their arched or in general narrow shape with rounded end, facilitating the dislodging of the surplus adhesive 3, this arched shape being the most appropriate for the moulding of this type of prefabricated pieces 2".

Once the drying time is completed, the edge of the tile for construction will be left totally clean by removing the surplus material, which includes both the perimetric flange 5' and the lateral projections 6, plus the surplus adhesive 3".

What is claimed is:

1. A tile for construction having a structure comprising a plurality of layers, wherein the tile comprises an upper lamina as visible surface; a lower lamina of ceramic origin defining a base; the upper lamina and the lower lamina are stuck by means of an adhesive, said adhesive forming a homogenous layer lacking in air bubbles so as to avoid union weakening and fragile zones creation, by providing an adhesive face of the lower lamina with a domed surface, said domed surface having a central point raised above surrounding points of the domed surface, said surrounding points gradually decreasing towards edges of said domed surface.

2. A tile for construction according to claim 1, wherein the lower lamina is a sheet of clay origin.

3. A tile for construction according to claim 1, wherein the lower lamina is a sheet of a material selected from sand origin, cement origin and a material having a strength greater than that of the upper lamina.

4. A tile for construction according to claim 1, wherein the upper lamina is made of wood and comprises at least one treatment selected from sanding, varnishing, resining, staining, a finishing proper to wood and combinations thereof.

5. A tile for construction according to claim 1, wherein the upper lamina is an agglomerate of a plurality of stained woods.

6. A tile for construction according to claim 1, wherein the upper lamina is made of at least one material selected from plastic, textile, natural, leather and combinations thereof.

7. A tile for construction according to claim 1, wherein the upper lamina is rigid and made of at least one material selected from glass, metal, natural stone and combinations thereof.

8. A tile for construction according to claim 1, wherein the lower lamina comprises a perimetric flange raising and projecting beyond a final contour of the tile, said perimetric flange acting as a retaining barrier for a material used as adhesive when pressing the sheets.

9. A tile for construction according to claim 8, wherein said perimetric flange has a plurality of internal lateral projections acting as centring means for centring the upper lamina during pressing, permitting an easy evacuation of surplus adhesive material.

10. A tile for construction according to claim 9, wherein said lateral projections for centring have a narrow configuration and a rounded contact end with the upper lamina.

* * * * *